(12) United States Patent
Koenen et al.

(10) Patent No.: US 10,263,485 B2
(45) Date of Patent: Apr. 16, 2019

(54) ALTERNATOR WITH INTEGRATED ENGINE CONTROLLER

(71) Applicant: Briggs & Stratton Corporation, Wauwatosa, WI (US)

(72) Inventors: Robert Koenen, Pewaukee, WI (US); Jason Hansen, Elkhorn, WI (US)

(73) Assignee: Briggs & Stratton Corporation, Wauwatosa, WI (US)

( * ) Notice: Subject to any disclaimer, the term of this patent is extended or adjusted under 35 U.S.C. 154(b) by 0 days.

(21) Appl. No.: 15/849,561

(22) Filed: Dec. 20, 2017

(65) Prior Publication Data

US 2018/0175691 A1 Jun. 21, 2018

Related U.S. Application Data

(60) Provisional application No. 62/437,186, filed on Dec. 21, 2016.

(51) Int. Cl.
| | |
|---|---|
| *F02B 63/00* | (2006.01) |
| *H02K 3/26* | (2006.01) |
| *F02N 5/04* | (2006.01) |
| *F02B 63/04* | (2006.01) |
| *H02K 11/215* | (2016.01) |
| *H02P 9/04* | (2006.01) |

(Continued)

(52) U.S. Cl.
CPC .................. *H02K 3/26* (2013.01); *F01P 1/02* (2013.01); *F01P 5/06* (2013.01); *F02B 63/042* (2013.01); *F02N 5/04* (2013.01); *F02N 11/04* (2013.01); *H02K 1/2793* (2013.01); *H02K 11/215* (2016.01); *H02P 3/22* (2013.01); *H02P 9/04* (2013.01); *H02P 25/022* (2013.01); *F02P 5/1506* (2013.01); *F02P 7/067* (2013.01)

(58) Field of Classification Search
CPC ...... H02K 3/26; H02K 11/215; H02K 1/2793; H02P 25/022; H02P 3/22; H02P 9/04; F02B 63/042; F02N 5/04
See application file for complete search history.

(56) References Cited

U.S. PATENT DOCUMENTS

| | | | | |
|---|---|---|---|---|
| 2,587,568 A | * | 2/1952 | Eisler | H01F 27/027 101/491 |
| 2,674,729 A | * | 4/1954 | Carter | G01D 5/2415 192/84.1 |

(Continued)

FOREIGN PATENT DOCUMENTS

| | | | | |
|---|---|---|---|---|
| DE | 102015209322 | * | 11/2016 | ............. H02K 21/24 |
| EP | 2225816 A1 | * | 9/2010 | ........... H02K 41/031 |

(Continued)

*Primary Examiner* — Thomas Moulis
(74) *Attorney, Agent, or Firm* — Foley & Lardner LLP (57) ABSTRACT

An engine control system includes an engine, crankshaft, and a flywheel. The flywheel is coupled to the crankshaft of the engine and includes a number of magnets arranged axially along a first side. The system further includes a printed circuit board including a number of coils integrated into the circuit board. The printed circuit board is positioned such that a first face of the printed circuit board is positioned parallel to the first side of the flywheel. Power is generated by the flywheel rotating and causing the magnetic fields associated with the magnets to induce a current though the coils integrated into the printed circuit board.

20 Claims, 5 Drawing Sheets

(51) Int. Cl.
*H02P 3/22* (2006.01)
*H02P 25/022* (2016.01)
*H02K 1/27* (2006.01)
*F01P 1/02* (2006.01)
*F01P 5/06* (2006.01)
*F02N 11/04* (2006.01)
*F02P 5/15* (2006.01)
*F02P 7/067* (2006.01)

(56) References Cited

U.S. PATENT DOCUMENTS

| | | | | |
|---|---|---|---|---|
| 2,702,353 A * | 2/1955 | Herson | | H02K 3/26 310/248 |
| 2,847,589 A * | 8/1958 | Haydon | | H02K 3/26 310/237 |
| 2,970,238 A * | 1/1961 | Swiggett | | H02K 3/26 226/188 |
| 3,046,427 A * | 7/1962 | Jacques | | H02K 3/26 310/268 |
| 3,054,011 A * | 9/1962 | Silverschotz | | G04C 3/16 310/268 |
| 3,084,420 A * | 4/1963 | Burr | | H02K 3/26 29/598 |
| 3,093,763 A * | 6/1963 | Sargeant | | H02K 3/26 310/154.05 |
| 3,096,455 A * | 7/1963 | Hahn | | H02K 3/26 310/154.06 |
| 3,686,521 A * | 8/1972 | Henry-Baudot | | H02K 23/54 310/268 |
| 3,796,039 A * | 3/1974 | Lucien | | G04C 13/11 310/207 |
| 4,051,402 A * | 9/1977 | Gruber | | H02K 23/56 310/266 |
| 4,099,104 A * | 7/1978 | Muller | | H02K 29/08 318/400.23 |
| 4,181,867 A * | 1/1980 | Muller | | H02K 29/08 310/156.34 |
| 4,336,785 A * | 6/1982 | Newberry | | F02P 1/083 123/149 A |
| 4,862,861 A * | 9/1989 | Dogadko | | F02P 1/02 123/599 |
| 5,097,167 A * | 3/1992 | Kanayama | | H02K 3/26 310/201 |
| 5,710,476 A * | 1/1998 | Ampela | | H02K 1/32 310/264 |
| 6,534,970 B1 * | 3/2003 | Ely | | G01D 5/2073 324/207.17 |
| 6,794,791 B2 * | 9/2004 | Ben Ahmed | | H02K 3/26 310/162 |
| 6,932,064 B1 * | 8/2005 | Kolak | | F02P 1/083 123/594 |
| 9,935,514 B1 * | 4/2018 | Lenius | | H02K 3/26 |
| 2010/0001610 A1 * | 1/2010 | Iki | | H02K 3/26 310/208 |
| 2016/0149527 A1 * | 5/2016 | Frampton | | H02P 9/00 322/17 |
| 2016/0241117 A1 * | 8/2016 | Cheung | | H02K 3/47 |
| 2016/0336824 A1 * | 11/2016 | Duan | | H02K 21/24 |
| 2016/0359400 A1 * | 12/2016 | Frampton | | H02K 9/19 |
| 2017/0009884 A1 * | 1/2017 | Muckenhirn | | F02B 75/28 |
| 2018/0212489 A1 * | 7/2018 | Schuler | | H02K 3/26 |

FOREIGN PATENT DOCUMENTS

| | | | | |
|---|---|---|---|---|
| WO | WO 2015092407 A2 * | 6/2015 | | H02K 21/24 |
| WO | WO 2015197054 A1 * | 12/2015 | | F01L 1/3442 |

* cited by examiner

ALTERNATOR WITH INTEGRATED ENGINE CONTROLLER

CROSS-REFERENCE TO RELATED APPLICATIONS

This application claims the benefit of U.S. Provisional Application No. 62/437,186, filed Dec. 21, 2016, which is incorporated herein by reference in its entirety.

BACKGROUND

The present invention relates generally to the field of engine controls, and specifically small engine controls. A typical small engine relies on a typical wound alternator to generate electrical energy, and, generally, a separate wound starter to provide an electronic starting mechanism for a small engine.

SUMMARY

One embodiment of the invention relates to an engine control system, the engine control system including an engine and a flywheel. The flywheel is coupled to a shaft of the engine, and includes a number of magnets arranged axially along a first side. The system further includes a printed circuit board including a number of coils integrated into the circuit board. The printed circuit board is positioned such that a first face of the printed circuit board is positioned parallel to the first side of the flywheel. Power is generated by the flywheel rotating and causing the magnetic fields associated with the number of magnets to induce a current through the coils integrated into the printed circuit board.

Another embodiment of the invention relates to an internal combustion engine including an engine block including a cylinder, a piston positioned within the cylinder and configured to reciprocate within the cylinder, a crankshaft coupled to the piston and configured to rotate about a crankshaft axis, a flywheel coupled to the crankshaft, multiple magnets coupled to the flywheel, and an alternator including a printed circuit board comprising multiple coils integrated into the printed circuit board configured to interact with the magnets to induce a current through the coils.

Alternative exemplary embodiments relate to other features and combinations of features as may be generally recited in the claims.

BRIEF DESCRIPTION OF THE DRAWINGS

The invention will become more fully understood from the following detailed description, taken in conjunction with the accompanying drawings, in which.

DETAILED DESCRIPTION

Before turning to the figures, which illustrate the exemplary embodiments in detail, it should be understood that the application is not limited to the details or methodology set forth in the description or illustrated in the figures. It should also be understood that the terminology is for the purpose of description only and should not be regarded as limiting.

Figure 1:
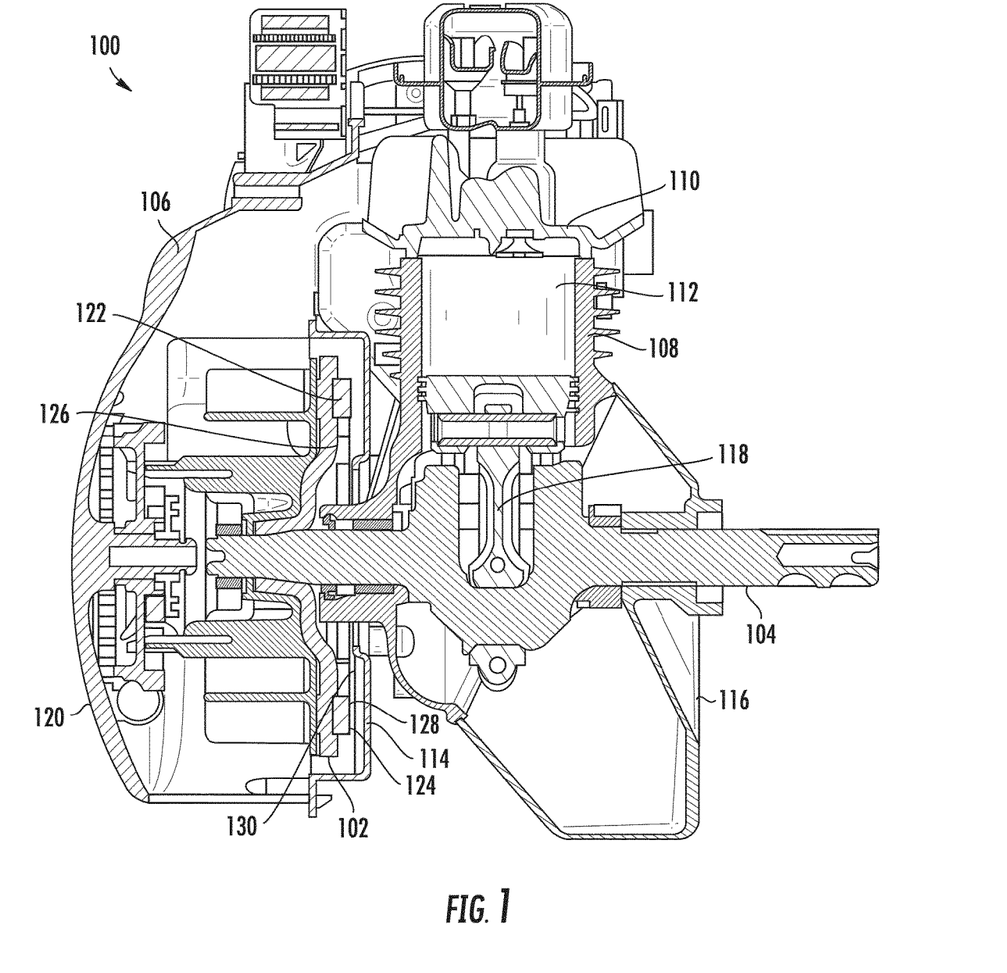
FIG. 1 is a side view of a portion of an internal combustion engine including a PCB alternator, according to some embodiments.

FIG. 1 is a sectioned view of an internal combustion engine 100 according to an exemplary embodiment. The engine 100 can include a flywheel 102 coupled to a crankshaft 104. The engine 100 may further include an engine block 106 having a cylinder 108, a cylinder head 110, a piston 112, the crankshaft 104, and a printed circuit board (PCB) alternator 114. The PCB alternator 114 is described in more detail below. The piston 112 reciprocates in the cylinder 108 along a cylinder axis to drive the crankshaft 104. The crankshaft 104 rotates about a crankshaft axis. The crankshaft 104 is positioned in part within a sump or crankcase 116. The engine 100 also includes a fuel system for supplying an air-fuel mixture to the cylinder (e.g., a carburetor, an electronic fuel injection system, a fuel direct injections system, etc., a camshaft 118 for actuating intake and exhaust values in the cylinder heads, a muffler, and a blower fan. The engine 100 includes a blower housing 120 configured to direct cooling air over the engine block 106 and other components of the engine 100. A blower fan pulls air into the blower housing 112 through an air inlet. The crankshaft 104 and crankshaft axis may be oriented horizontally (i.e., a horizontal engine) or vertically (i.e., a vertical engine). The engine 100 may include one cylinder 108 or two or more cylinders. The engine 100 may be used in outdoor power equipment, standby generators, portable jobsite equipment, or other appropriate uses. Outdoor power equipment includes lawn mowers, riding tractors, snow throwers, pressure washers, portable generators, tillers, log splitters, zero-turn radius mowers, walk-behind mowers, riding mowers, industrial vehicles such as forklifts, utility vehicles, etc. Outdoor power equipment may, for example, use an internal combustion engine to drive an implement, such as a rotatory blade of a lawn mower, a pump of a pressure washer, the auger of a snow thrower, the alternator of a generator, and/or a drivetrain of the outdoor power equipment. Portable jobsite equipment includes portable light towers, mobile industrial heaters, and portable light stands.

The flywheel 102 may include a plurality of magnets 122, 124 arranged axially around an outer circumference of the flywheel 102 along a first side 126. In other embodiments, the magnets may be arranged radially along an outer edge of the flywheel 102. In other embodiments, the magnets may be arranged along both the first side 126 and a second side of the flywheel 102. In other embodiments, the magnets are parallel to the first side 126 of the flywheel 102. The first side 126 of the flywheel 102 is positioned opposite the second side, with a perimeter or outer edge of the flywheel 102 extending between. For example, in a vertically shafted engine in a normal operating position, the first side 126 of the flywheel 102 is the top side or surface and the second side of the flywheel is the bottom side or surface. In a horizontally shafted engine in a normal operating position, the first side 126 and second side of the flywheel 102 are the left side and the right sides, respectively, or vice versa. The number of magnets 122, 124 may vary depending on the size of the flywheel 102 and the configuration of the PCB alternator 114. For example, some flywheels 102 may have ten magnets arranged along the first side 126. However, more than ten magnets or less than ten magnets arranged along the first side 126 of the flywheel 102 are also considered. As the flywheel 102 rotates with the crankshaft 104, a rotating magnetic field is generated via the magnets 122, 124. A portion of the PCB alternator 114 passes through the rotating magnetic field to induce a current. The induced current may then generate a voltage, thereby generating electrical energy from the mechanical energy associated with the rotation of the flywheel 102. In one embodiment, the PCB alternator 114 is positioned in proximity to the flywheel such that the magnetic field generated by the magnets 122, 124 is sufficiently concentrated to induce the desired current. In some embodiments, the PCB alternator 114 may be positioned such that there is about 2 mm of clearance between a face 128 of the magnets 122, 124 and a face 130 of the PCB alternator 114. In other examples, there may be less than 2 mm of clearance or more than 2 mm of clearance between the face 128 of the magnets 122, 124 and the face 130 of the alternator 114.

Figure 2:
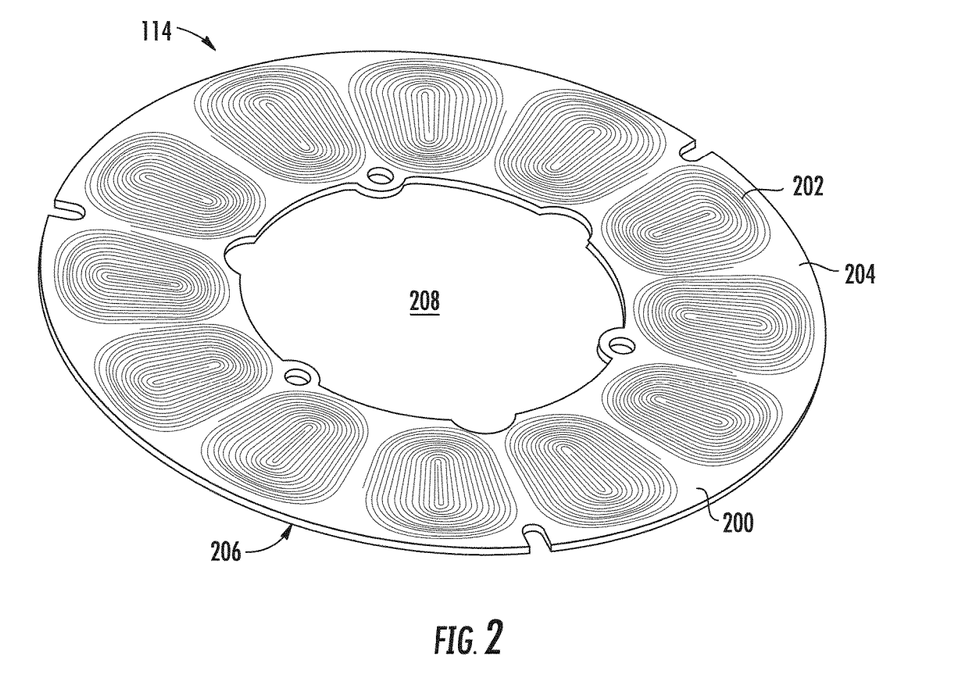
FIG. 2 is a perspective view of a PCB alternator for use in an internal combustion engine, according to some embodiments.

Turning now to FIG. 2, a perspective view of the PCB alternator 114 of FIG. 1 is shown, according to some embodiments. The PCB alternator 114 can be constructed on a substrate 200. In one embodiment, the substrate 200 is constructed of FR4 fiberglass. However, other materials are contemplated. The PCB alternator 114 may include one or more coils 202 on a first side 204. The coils 202 may be constructed of conductive materials deposited onto the substrate 200 and chemically etched to form the coils 202. For example, the coils 202 may be constructed of copper. However, other conductive materials are contemplated. In some embodiments, the coils 202 may be formed by separately forming the coils of conductive material and subsequently fastening the coils 202 to the substrate 200. For example, the coils 202 may be fastened to the substrate 200 using an adhesive, such as glue or epoxy. In some embodiment, the coils 202 can be formed by stamping the coils out of conductive material. In other embodiment, the coils 202 can be formed by cutting the coils out of a conductive material, such as by laser cutting. Each coil 202 may have a defined number of windings. For example, each coil may have twenty windings. However, in other examples, the coils 202 may have more than twenty windings or less than twenty windings. Further, in some embodiments, the PCB alternator 114 may have multiple layers of conductive material disposed within the substrate 200. This can allow for additional coils 202, or other circuitry and/or connections within the PCB alternator 114.

In some embodiments, the coils 202 are configured to produce a single phase output when a rotating magnetic field is applied across the coils 202. However, in other embodiments, the coils 202 may be configured to produce a three-phase voltage output. For example, the coils 202 may be configured in a WYE configuration or a Delta configuration for producing a three-phase output. In some embodiments, a plate (not shown) made of ferrous material may be placed on a second side 206 of the substrate 200. The ferrous plate can be used to focus the magnetic fields of the magnets 122, 124 towards the coils 202. Focusing the magnetic field towards the coils 202 can be increase the efficiency of the PCB alternator 114, thereby allowing for more energy to be produced. In one embodiment, the ferrous plate is a steel plate. However, other ferrous materials are contemplated.

In some embodiments, a second flywheel or a second face of the flywheel 102 may be placed adjacent to the second side 206 of the substrate 200. The second flywheel may additionally have magnets along a face adjacent to the second side 206 of the substrate 200. The second side 206 of the substrate may further include a number of coils arranged about the second side 206. In some embodiments, the coils arranged about the second face may be a mirror image of the coils 202 on the first side 204, and can be constructed of conductive materials deposited onto the second side 206 of the substrate 200. By placing coils on the second side 206 of the substrate, the PCB alternator 114 can be configured to generate additional current, where a second flywheel or a second face of the flywheel 102 can generate a rotating magnetic field in proximity to the coils located on the second side 206 of the substrate. For example, if the number of coils on the second side 206 of the substrate 200 is equal to the number of coils on the first side 204 of the substrate 200, the available current may approximately double if coils on the second side 206 are put in parallel with the coils on the first side 204 or the voltage may approximately double if the coils on the second side 206 are put in series with the coils on the first side 204 of the substrate 200.

The PCB alternator may be configured with an aperture 208 located in the center of the PCB alternator 114. The aperture 208 can be configured to fit over the crankshaft 104 of the engine 100, to allow the crankshaft 104 to be coupled to the flywheel 102. In some embodiments, the PCB alternator 114 is coupled directly to the engine block 106. However, in other embodiments, the PCB alternator 114 may be configured to mount to other components of the engine 100 to provide mechanical and/or electrical isolation between the engine block 106 and the PCB alternator 114.

Figure 3:
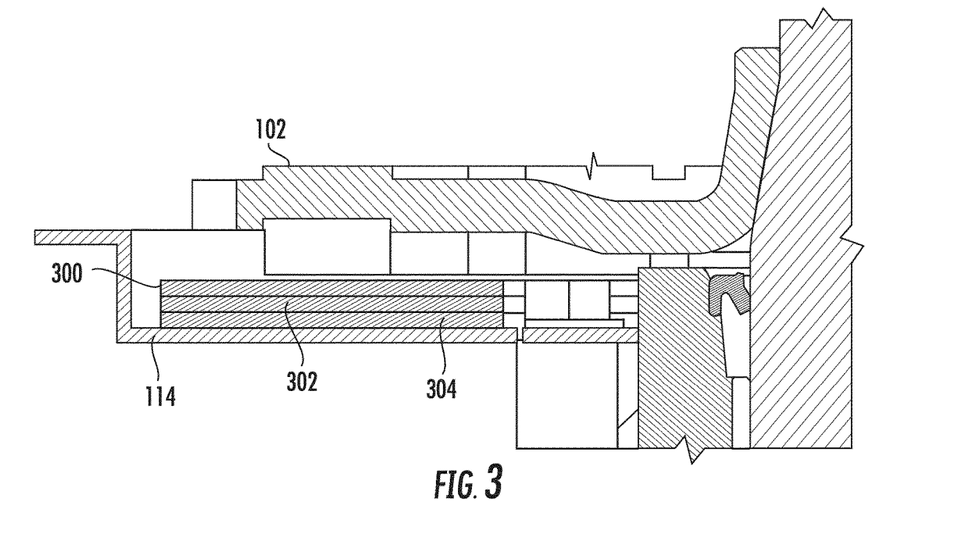
FIG. 3 is a side view of a portion of the internal combustion engine of FIG. 1 including a PCB alternator and a flywheel having one or more magnets for interfacing with the PCB alternator.

Turning now to FIG. 3, a cross-sectional view showing the flywheel 102 and the PCB alternator 114 is shown, according to some embodiments. As shown in FIG. 3, the PCB alternator 114 is configured as a multiple-layer PCB assembly having a first substrate 300, a second substrate 302 and a third substrate 304. This can allow for additional circuitry and/or functionality to be provided by providing additional circuit board area for development. In other examples, the use of multiple layers may allow for conductive trace widths to be increased, therefore allowing for greater current carrying capacity within the PCB alternator 114. Additionally, the user of multiple layers can allow for additional conductive traces to be utilized, which can allow for greater current carrying capacity within the PCB alternator. For example, by using multiple traces in a parallel configuration, the available current carrying capacity of the PCB alternator 114 can be increased.

Figure 4:
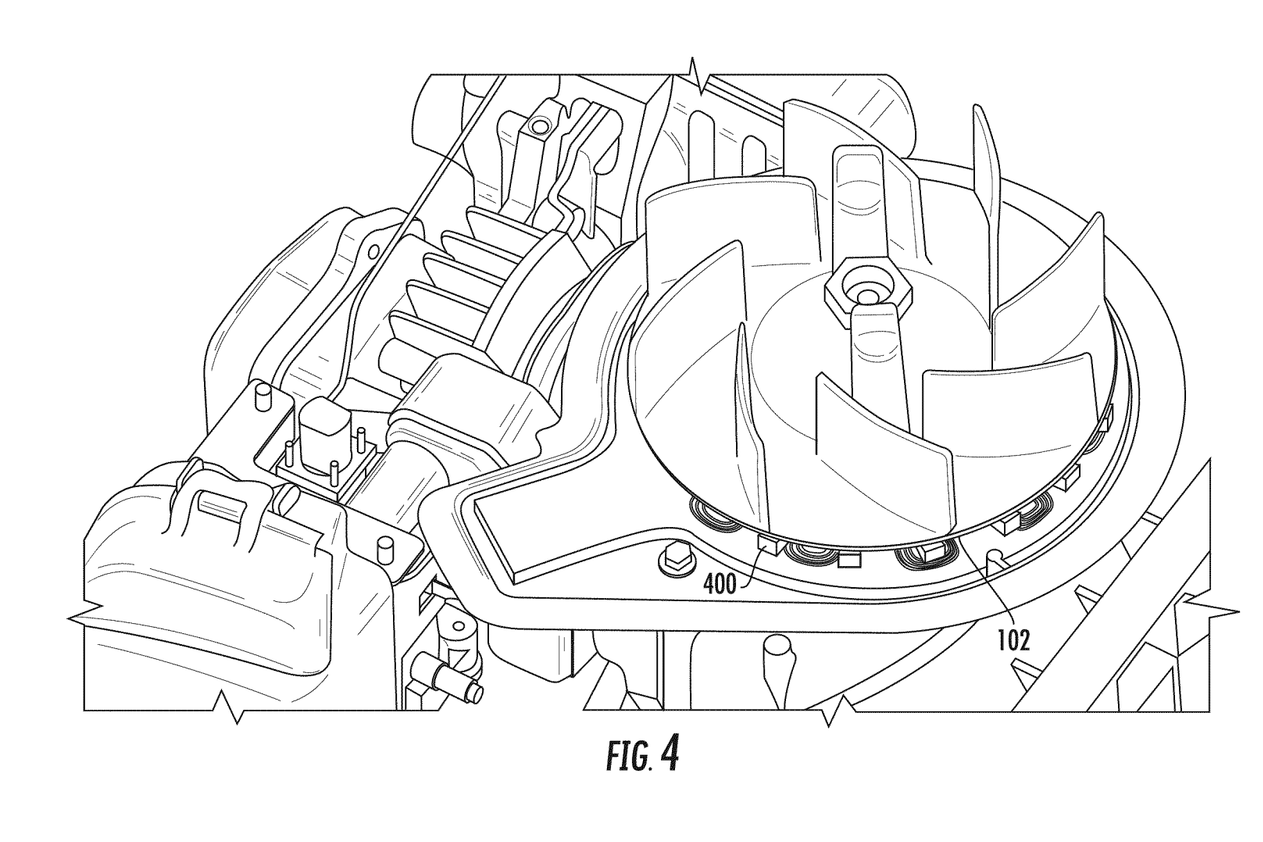
FIG. 4 is a perspective view of a portion of the internal combustion engine of FIG. 1 including the PCB alternator, according to some embodiments.

FIG. 4 provides a perspective view of the engine 100. The flywheel 102 is shown in relation to the PCB alternator 114. As shown in FIG. 4, the flywheel 102 may have a plurality of teeth 400 positioned radially about the outer circumference of the flywheel 102. In one embodiment, the teeth 400 are spaced equidistant from each other. In some examples, the PCB alternator 114 may include other circuitry, including a proximity sensor (discussed in more detail below). The proximity sensor may be configured to detect the passing of one or more of the plurality of teeth 400 to determine a speed of the flywheel 102. In some embodiments, the flywheel 102 may have a single tooth removed to allow for a position of the flywheel 102 to be determined, as will be discussed in more detail below.

Figure 5:
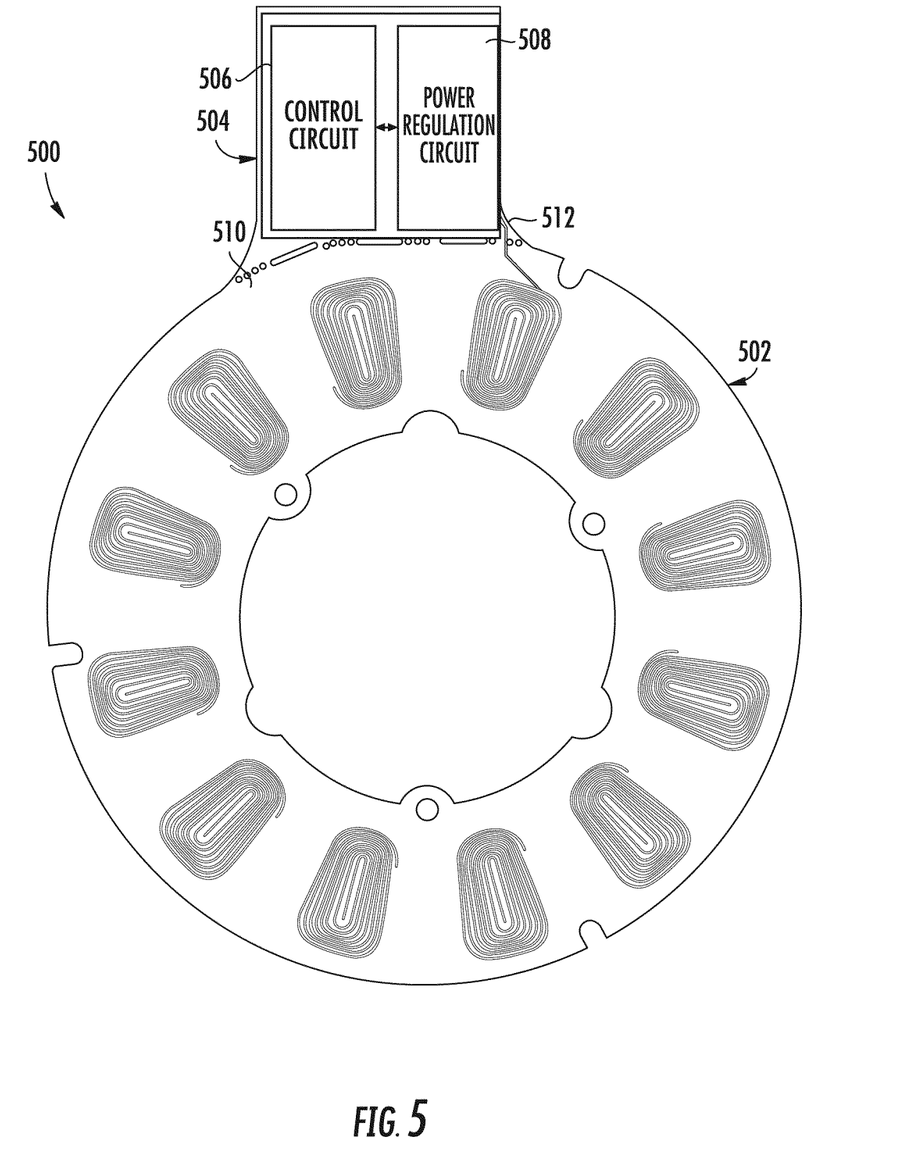
FIG. 5 is a schematic view of the PCB alternator and additional control circuitry, according to some embodiments.

Turning now to FIG. 5 a further embodiment of a PCB alternator 500 is shown. The PCB alternator 500 includes an alternator section 502 and a control circuitry section 504. The control circuity section 504 may include a control circuit 506 and a power regulation circuit 508. In some embodiments, the control circuitry section 504 may be detachable from the alternator section 502. For example, the control circuitry section 504 may have perforated attachment points 510 which can allow for the control circuitry section 504 to be "snapped" off by a user or tool. This can be used when the additional control circuitry on the control circuitry section 504 is not needed, or where space constraints within an engine require the control circuitry section 504 to be located elsewhere in the engine. In still further embodiments, portions of the control circuitry section 504 may be have perforated attachment points to allow for portions of the control circuitry section 504 to be removed, as needed. This can allow for a single control circuity section 504 to be used across multiple engine types. In some embodiments, electrically conductive traces 512 can be run from the control circuitry section 504 to the alternator section 502 to eliminate the need for connectors between the alternator section 502 and the control circuitry portion 504.

The power regulation circuit 508 and the control circuit 506 may be in electrical communication with each other. In one embodiment, the power regulation circuit 508 may receive electrical power directly from the alternator section 502. In some embodiments, the received electrical power is a single phase AC power. In other embodiments, the received electrical power is a three-phase AC power. In still further embodiments, the received electrical power may be DC power. The frequency of the received electrical power is a function of the speed of the flywheel and the number of coils 514 located on the alternator section 502. In some embodiments, the circuitry (e.g. the control circuit 506 and the power regulation circuit 508) is fully scalable based on the type of engine that is being used. In some examples the control circuitry section 504 may include provisions for all inputs and outputs, but may only be populated with certain components (and therefore only have certain features) based on the features associated with the engine. For example, some inputs, outputs and components may be omitted when the PCB alternator 500 is being installed in a low feature, or economy engine. However, by utilizing a common circuit board configuration for the control circuitry section 502, a reduction of inventory and associated costs is achieved.

The power regulation circuit 504 may include one or more power supply circuits. The power supply circuits may be configured to transform the voltage levels provided by the alternator portion into voltage levels required by the control circuit 506. The power regulation circuit 504 may further include rectification circuitry to produce one or more DC voltage levels for use by the control circuit 506. In still other embodiments, the power regulation circuit 504 may include energy storage devices such as capacitors, batteries, or other power storage devices for storing excess energy provided by the alternator section 502. This excess energy can be used to help control speed, electronically starting the engine, electronic braking, and electronic ignition. Further, where the engine 100 is a pull-start engine, the energy storage devices may be used to store sufficient energy to power the control circuit 506 during initial startup. These features are discussed in more detail below.

Figure 6:
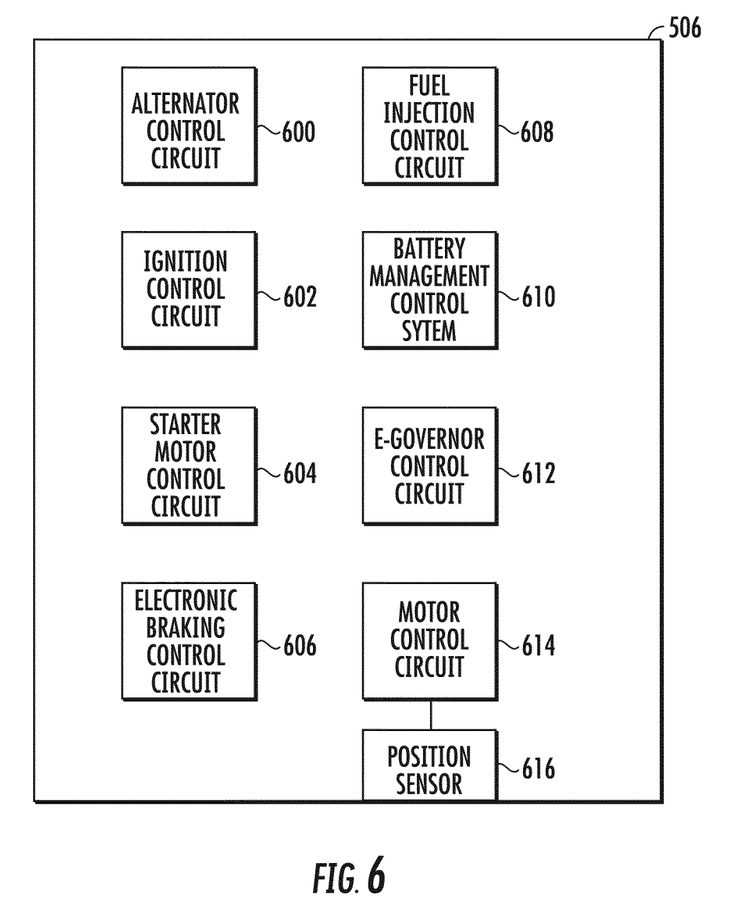
FIG. 6 is a schematic representation of the control circuit, according to some embodiments.

Turning now to FIG. 6, a schematic representation of the control circuit 506 is shown, according to some embodiments. The control circuit 506 may include an alternator control circuit 600, an ignition control circuit 602, an electronic starter control circuit 604, an electronic braking circuit 606, a fuel injection control circuit 608, a battery management control system 610, an e-governor control circuit 612, and an engine control circuit 614. The engine control circuit may be coupled to one or more sensors 616.

The alternator control circuit 600 can be configured to control aspects of a PCB alternator, such as PCB alternator 114. For example, the alternator control circuit 600 may be configured to determine a power level being received from the PCB alternator 114. The alternator control circuit 600 may receive power level information from one or more other circuits, including the power regulation circuit 504. Based on the received power level information, the alternator control circuit 600 may be able to provide a speed instruction to the engine control circuit which can instruct the engine to speed up or slow down to increase or decrease the amount of power being generated by the PCB alternator 500, respectively. In another embodiment, the alternator control circuit 600 may provide a drive signal directly to the PCB alternator which may cause the PCB alternator 500 to produce more power, or less power, as needed. For example, the alternator control circuit 600 may shunt the coils to a lower potential to increase the amount of current generated by the PCB alternator 500, which can cause an increase in power generated by the PCB alternator 500.

The ignition control circuit 602 may be used to control an ignition circuit of the engine 100. For example, the ignition control circuit 602 may be configured to provide a signal to a spark plug during the operation of the engine 100. The signal may instruct the spark plug to fire, thereby causing ignition during the power stroke of the engine operation. In some embodiments, the ignition control circuit 602 may transmit stored energy from the power regulation circuit 504. For example, energy collected during the power stroke of operating cycle may be converted to electrical energy by the PCB alternator 500 and stored in an energy storage device of the power regulation circuit 504, as described above. This stored energy may then be transmitted to the spark plug to initiate combustion, and therefore initiate the next power stroke. The ignition control circuit 602 may further be configured to provide energy to a spark plug of the engine during an initial start of the engine. For example, upon receiving an input indicating an attempt to start the engine, the ignition control circuit 602 may transfer energy stored in the power regulation circuit 504, to initiate combustion. In one example, the input may be a position or speed of the flywheel as monitored by the engine control circuit 614. In other examples, the input may be provided by an electronic start system, such as via the electronic starter control circuit 604. In some embodiments, the primary coils and secondary coils associated with an ignition system of the engine 100 may be integrated into the PCB alternator 500. In other embodiments, the primary coils and the secondary coils may be integrated into the control circuit 506.

The electronic starter control circuit 604 may be configured to control an electronic starter motor associated with the engine 100. For example, the electronic starter control circuit 604 may detect an input indicating that the engine 100 needs to be started. The electronic starter control circuit 604 can then provide energy to a starter motor to turn the crankshaft and start the engine 100. In one embodiment, the energy can be provided via an external power source, such as a battery. In other examples, power may be stored within the power regulation circuit 508 and subsequently be used to power the starter motor. In still further examples, power may be stored in one or more energy storage devices, and subsequently be used to power the starter motor. Example energy storage devices can include batteries, capacitors, super-capacitors, fuel cells, etc. In some embodiments, the electronic starter control circuit 604 can be used to convert the PCB alternator 500 into a starter device. The electronic starter control circuit 604 can be configured to sequentially apply power to one or more coils of the PCB alternator, thereby inducing a rotating magnetic field. This rotating magnetic field can cause rotation of the flywheel 102 via the magnets 122, 124, which in turn can cause rotation of the crankshaft 104. Where the PCB alternator 114 is configured in a three phase arrangement, rotation of the flywheel 102 can be achieved via the sequence in which power is applied to the coils of the PCB alternator 500. Where the PCB alternator 500 is configured in a single phase arrangement, a starter coil may be required to be integrated into the PCB alternator 500 to provide the initial rotation.

The electronic braking circuit 606 may be configured to provide electronic braking to the engine 100. Specifically, the electronic braking circuit 606 may short the coils of the PCB alternator 500 to ground in order to drive up the current generated. This substantial increase in generated current can substantially load down the flywheel via the increase in required energy, thereby providing a braking force to the engine 100. In some embodiments, the electronic braking circuit 606 may shunt the coils of the PCB alternator 500 to ground via a braking resistor. In some examples, the braking resistor may be a variable resistor to allow for variable braking control. In other embodiments, solid state devices, such as MOSFETs or other transistors, may be used to control the amount of current being shunted to ground, providing for variable braking control. In still further embodiments, the electronic braking circuit 606 may be configured to short the coils of the PCB alternator 500 to each other to provide a braking force. In some examples, it may be advantageous to use a three-phase configuration of the coils of the PCB alternator 500 to divide the current generated during the braking phase by one-third by dividing the braking current among the three phase coils. In some embodiments, the electronic braking circuit 606 is coupled to a kill switch associated with the engine 100. By coupling the electronic braking circuit 606 to a kill switch, a user can activate the kill switch to quickly stop the engine 100. In some embodiment, the electronic braking circuit 606 may include a pulse-width modification driver to pulse the brake (e.g. pulse the shorting of the coils of the PCB alternator 500.) This can allow for the braking to be regulated by the electronic braking circuit 606.

The fuel injection control circuit 608 may be configured to control the fuel injection on a fuel injected engine. The fuel injection control circuit 608 may be powered via the power regulation circuit 504. The battery management control circuit 610 may be configured to provide power management of one or more batteries used with the engine 100. For example, the battery management control circuit 610 may include a State-of-Charge (SoC) controller for managing the charge associated with the one or more batteries. The SoC controller may be used to monitor charging, discharging, and maintenance of the one or more batteries. The SoC controller may be used with Lithium Ion batteries, as well as other batteries such as NiCd or other battery types. In some embodiments, power cells (e.g. batteries) could be placed directly onto the PCB alternator 114, or built into the PCB alternator 114 itself.

The e-governor control circuit 612 can be configured to control an e-governor system. In one example, the e-governor system may be an e-governor system as disclosed in U.S. patent application Ser. No. 14/702,435 entitled "Electronic Governor System and Load Sensing System," the content of which is incorporated herein in its entirety. The e-governor control circuit 612 may include a controller and a stepper motor which can be coupled to a throttle plate via a connection device, such as a throttle shaft to control the throttle plate. In some examples, the control circuitry section 504 of the PCB alternator 500 may be positioned over the throttle plate to allow for a direct connection between the e-governor control circuit 612 and the throttle.

The engine control circuit 614 may be configured to control the operation of the engine 100. In some embodiments, the engine control circuit 614 may be in communication with the control circuits described above that are located on the control circuit 506. In some examples, the engine control circuit 614 may have supervisory control over all other control circuits associated with the control circuit 506. In one embodiment, the engine control circuit 614 may be in communication with one or more sensors 616 associated with the engine. In some embodiment, the sensor 616 may be a position sensor. The sensor 616 may be able to detect the passing of the teeth 400 of the flywheel 102. For example, the sensor 616 may be a hall-effect sensor. As stated above, the flywheel 102 may have a number of teeth 400 arranged radially about an outer circumference of the flywheel 102. However, in other embodiments the teeth may be arranged axially along an outer diameter of a face of the flywheel 102, such as the first face 126, or a second face. The sensor 616 may detect the passing of the teeth 400 and transmit the data to the engine control circuit 614 which may determine a speed of the engine 100 based on the passing of the teeth 400 over the sensor 616. In some embodiments, the flywheel 102 may have one tooth 400 missing. The sensor 616 may detect the missing tooth 400, and the engine control circuit 614 may then determine a position of the engine 100 crankshaft 104 by evaluating the number of teeth 400 have passed over the sensor since the missing tooth 400 was detected.

In some embodiment, the engine control circuit 614 is configured to control the speed of the engine 100. In some examples, the engine control circuit 614 can communicate with the e-governor control circuit 612 to control the speed of the engine 100. In further embodiments, the engine control circuit 614 may be used to reduce vibrations associated with the engine 100 by controlling energy flow into and out of the PCB alternator 500. For example, the PCB alternator 500 may be configured to generate energy during the power stroke of the engine 100. This energy may be stored in one or more energy storage devices, as described above. The engine control circuit 614 can then be configured to transfer the stored energy back into the PCB alternator 500 to convert the alternator from a generator to an engine. This can provide additional power to the engine 100 via the crankshaft 104 during low power portions of the combustion cycle. This can reduce vibration associated with heavy loading of the engine 100. Further, by acting as an additional engine during the low power portions of the combustion cycle, the PCB alternator 500 can allow for a lighter weight flywheel 102 to be used due to the reduction in inertia required.

The construction and arrangement of the apparatus, systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, some elements shown as integrally formed may be constructed from multiple parts or elements, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures may show or the description may provide a specific order of method steps, the order of the steps may differ from what is depicted. Also two or more steps may be performed concurrently or with partial concurrence. Such variation will depend on various factors, including software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. An engine control system, comprising:
    an engine including a crankshaft;
    a flywheel coupled to the crankshaft of the engine, and comprising a plurality of magnets arranged along a first side of the flywheel;
    a printed circuit board, comprising a plurality of coils integrated into the printed circuit board; and
    a ferrous plate positioned on an opposite side of the printed circuit board as the flywheel;
    wherein the printed circuit board is positioned such that a first face of the printed circuit board is positioned parallel to the first side of the flywheel;
    wherein power is generated by the flywheel rotating causing the magnetic fields associated with the plurality of magnets to induce a current through the plurality of coils;
    wherein the ferrous plate focuses the magnetic fields associated with the plurality of magnets towards the plurality of coils.

2. The engine control system of claim 1, wherein the printed circuit board further comprises an engine control circuit, wherein the engine control circuit is configured to regulate the induced current.

3. The engine control system of claim 2, wherein the engine control circuit is mounted to a control portion of the printed circuit board.

4. The engine control system of claim 1, wherein the engine control circuit comprises at least one of an electronic governor control circuit, a voltage regulation circuit, an alternator control circuit, an electronic braking control circuit, an electronic ignition control circuit, an electronic starter control circuit, a position sensor, a fuel injection circuit, and a battery management circuit.

5. The engine control system of claim 1, wherein the plurality of coils are configured to generate a three phase output voltage.

6. The engine control system of claim 1, wherein the plurality of coils are configured to be shunted to a common point to provide a braking force.

7. The engine control system of claim 1, further comprising a power supply configured to supply electricity to the plurality of coils to provide a locomotive force to the flywheel.

8. The engine control system of claim 3, wherein the control portion of the printed circuit board is removable.

9. The engine control system of claim 1, further comprising a sensor for detecting a position of the flywheel.

10. The engine control system of claim 9, wherein the sensor is a hall effect sensor.

11. The engine control system of claim 1, wherein the plurality of magnets are arranged axially along the first side of the flywheel.

12. An internal combustion engine, comprising:
    an engine block including a cylinder;
    a piston positioned within the cylinder and configured to reciprocate within the cylinder;
    a crankshaft coupled to the piston and configured to rotate about a crankshaft axis;
    a flywheel coupled to the crankshaft;
    a plurality of magnets coupled to the flywheel;
    an alternator including a printed circuit board comprising a plurality of coils integrated into the printed circuit board configured to interact with the plurality of magnets to induce a current through the plurality of coils; and
    a ferrous plate positioned on an opposite side of the printed circuit board as the flywheel, the ferrous plate focuses magnetic fields associated with the plurality of magnets towards the plurality of coils.

13. The internal combustion engine of claim 12, wherein the plurality of magnets are arranged along a first side of the flywheel.

14. The internal combustion engine of claim 13, wherein the printed circuit board is positioned such that a first face of the printed circuit board is positioned parallel to the first side of the flywheel.

15. The internal combustion engine of claim 12, wherein the plurality of magnets are arranged along a first side of the flywheel and along a second side of the flywheel.

16. The internal combustion engine of claim 12, wherein the plurality of magnets are parallel to a first side of the flywheel.

17. The internal combustion engine of claim 12, wherein the plurality of magnets are arranged axially along a first side of the flywheel.

18. The internal combustion engine of claim 12, wherein the printed circuit board further comprises an engine control circuit, wherein the engine control circuit is configured to regulate the induced current.

19. The internal combustion engine of claim 17, wherein the engine control circuit is mounted to a control portion of the printed circuit board.

20. The internal combustion engine of claim 18, wherein the control portion of the printed circuit board is removable.

\* \* \* \* \*